Jan. 3, 1950  C. F. SOPCAK  2,493,040
NONARCING POTENTIOMETER
Filed Sept. 3, 1946
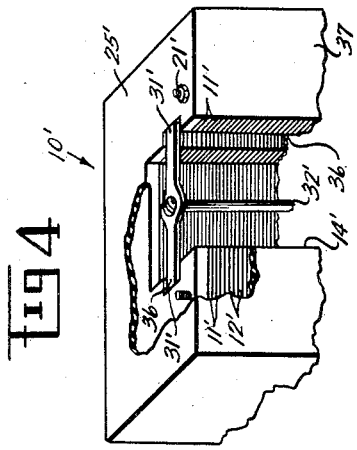
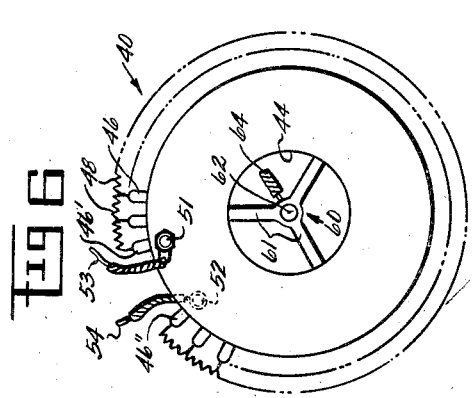
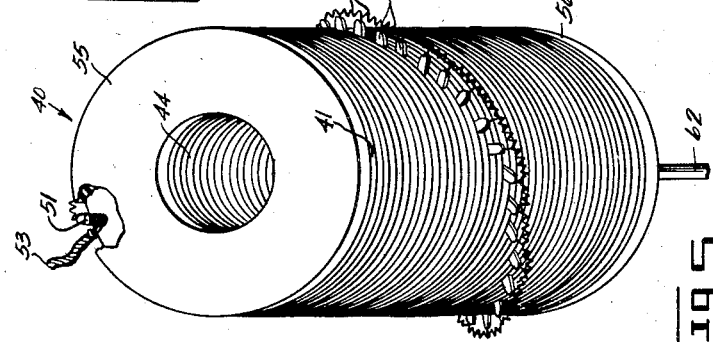
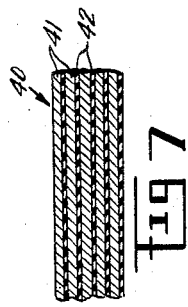
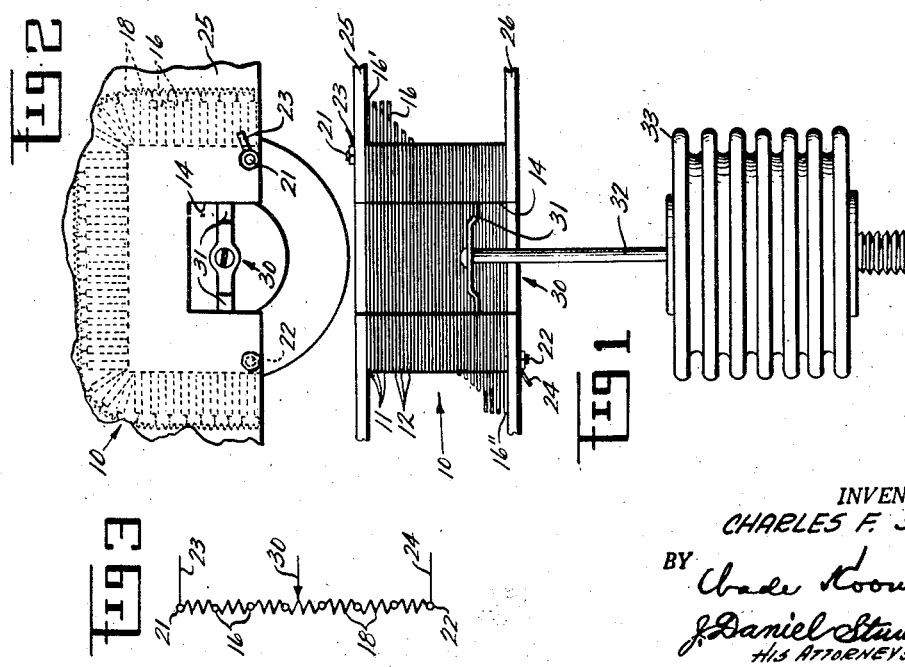
INVENTOR.
CHARLES F. SOPCAK
BY
HIS ATTORNEYS Patented Jan. 3, 1950

2,493,040

UNITED STATES PATENT OFFICE 2,493,040

NONARCING POTENTIOMETER

Charles F. Sopcak, Dayton, Ohio

Application September 3, 1946, Serial No. 694,445

10 Claims. (Cl. 201—48)

(Granted under the act of March 3, 1883, as amended April 30, 1928; 370 O. G. 757)

The invention described herein may be manufactured and used by or for the Government for governmental purposes without payment to me of any royalty thereon.

This invention relates to a novel type of potentiometer, and more particularly to a potentiometer adapted for use in connection with electrical indicating instruments used on aircraft.

In various instances it is of considerable advantage to utilize a potentiometer which is not influenced to any appreciable extent by means of vibrations to which it is subjected. For example, when the potentiometer is used on aircraft for measuring engine oil pressure, where it has been customary to shock-mount the instrument on the firewall of the airplane and then pipe oil, whose pressure is to be measured, from the engine to this instrument. The potentiometer therein customarily controls an electrical indicating instrument which is mounted on the instrument panel of the aircraft so as to furnish an indication of the engine oil pressure to the pilot. But the conventional type of potentiometer device is apt to break contact and cause arcing and thus does not operate satisfactorily when subjected to severe vibrations. Accordingly, the potentiometer could not be placed upon the airplane engine itself, where it would be subjected to severe vibrational forces, but instead was usually shock-mounted on the firewall, and the engine oil was then conveyed to the device through a conduit. This system, however, has its disadvantage that at the low temperatures encountered at high altitudes or in the arctic regions the oil tends to congeal in such a pressure transfer line, thus preventing the associated indicating instrument from accurately indicating the pressure of the engine oil.

It is an essential object of this invention to provide a device whereby to eliminate the difficulty experienced with the conventional types of potentiometers when subjected to vibration, and whereby to overcome the effects of all vibrations, thus enabling such a pressure measuring device to be mounted directly on the rear end of the engine along with the other engine accessories, thereby eliminating the defects and the troubles caused by the forms of potentiometers formerly used.

It is another object of this invention to provide a potentiometer in which a very small amount of movement is sufficient to produce a substantial change in the ratio of the potentiometer arms and of the indicating position of the connected indicator needle on the indicating instrument; and at the same time, provide one in which the resistance change is sufficiently continuous to eliminate any jumping of the indicator needle as the movable contact arm is moved slowly from one position to another in the commutator.

A further object of this invention is to provide such a potentiometer which is non-arcing, and is so arranged that the contactor can be made thin and light, thereby reducing friction between the contactor and the commutator.

These and various other objects and advantages are attained with this invention as will become apparent from the following description, taken in connection with the accompanying drawings wherein the invention is shown in its preferred form, it being evident that other arrangements and forms of construction may be resorted to in carrying out the objects and purposes of this invention.

In the drawings:

Fig. 1 is a side elevational view illustrating one form of my invention and one manner and means of actuating the same.

Fig. 2 is a plan view of this form of potentiometer.

Fig. 3 is a schematic wiring diagram of this potentiometer.

Fig. 4 is a perspective view of a slightly modified form of the invention, showing the recess in the commutator grooved and also showing a protective coating around the resistance wiring and lugs.

Fig. 5 is a perspective view showing a modified form of potentiometer, cylindrical in shape.

Fig. 6 is a plan view of this form, showing the contactor as comprising three contact arms.

Fig. 7 is an enlarged detail view of the metal plates and insulation.

Briefly, this potentiometer, in either of its forms, is of non-arcing construction and comprises a laminated commutator provided with insulation between the laminations, being adapted to be arranged in various shapes and forms. It is shown in Figs. 2 and 4 as being rectangular with the commutator substantially yoke-shaped, and is shown in Fig. 5 as being substantially cylindrical in form. The contact member in either form of this invention includes a plurality of contact arms or elements spaced apart and arranged for operation in a channel provided in the commutator, said arms being arranged so that at all times at least one of the arms will be in contact with the channel wall, irrespective of the vibrational force to which the potentiometer may be subjected.

Referring especially to Figs. 1 and 2 of the drawings, this form of potentiometer comprises a laminated commutator 10, which is rectangular in form and is substantially yoke-shaped and built up of a plurality of laminations or thin metal plates 11, preferably silver. Layers of insulation 12 are provided between said plates, such as Formex, or other insulating varnish or enamel which will provide the required insulation to withstand the potential difference between the adjacent laminations.

These laminations 11, especially when blanked out of silver sheet, and the insulation 12 therebetween are relatively very thin. Said laminations or plates may be only about .001", and the insulation therebetween of the coat of enamel or varnish, may be only .00025".

The commutator plates or laminations are substantially yoke-shaped and provide a rectangular channel or recess 14 in the intermediate part thereof, said recess extending at right angles to said plates and being open at the near side of this commutator as seen in the drawings. Each lamination is provided with an arm or lug 16 on its outer edge, and a resistance wire 18 is soldered to said lugs, thereby connecting the adjacent pair of lugs of the two adjoining plates 11. These lugs, from the top plate lug 16' to the bottom plate lug 16", are preferably staggered vertically and a pair of these lugs 16 along with the wires 18 between each pair form segments or portions of a continuous coil of resistance wire which is soldered throughout its length to the various lugs. A top terminal 21 and a bottom terminal 22 are connected to the two ends of said coil, on said end lugs 16' and 16", and constitute the ends of the potentiometer winding. These terminals are adapted for connection with the wires 23 and 24 of the circuit of an electric indicating instrument or meter (not shown), in conjunction with which this potentiometer is used to operate the same.

The length of the resistance wire between each pair of lugs thus determines the resistance pattern herein. Therefore, if it is desired that this potentiometer have a uniform taper, the number of turns of resistance wire 18 between a pair of lugs 16 will be equal; however, if a variable taper is desired, then the number of turns between the two successive lugs will be varied to provide such tapering resistance, either from one end of the commutator to the other, or from an intermediate part of the commutator toward both ends.

Top and bottom plates 25 and 26 of insulating material are provided on the ends of the commutator and serve as protection for the opposite ends and for the lugs and wires therebetween.

The contact member 30 utilized in my potentiometer is of novel construction. It is provided with a plurality of contact elements or arms 31, said arms being spaced apart and extending from each other, being shown in Fig. 1 as two oppositely extending arms or a double-ended contact arm. This member 30 is mounted on the end of a rod 32 which is shown as connected with a pressure sensitive member 33, such as a Sylphon bellows, which is adapted to be connected with a device containing oil under pressure for measuring its pressure. The contact member 30 is suitably connected with the indicator needle of the electric indicating instrument, as through its rod 32, when of metal, or through a conducting wire connected with the contactor, as shown in Fig. 6.

This novel potentiometer is likewise adapted to be utilized for indications of temperature, engine speed, airplane flap or trim tab position, or other indications that can be converted to a linear motion, so as to effect a linear movement of the contactor within the commutator.

In Fig. 3 a wiring diagram is shown of this potentiometer including the resistance windings 17 connected to the lugs 16 and the wires 23 and 24 extending from the terminals 21 and 22 and from the ends of said windings, along with the contactor 30. Said wires 23 and 24 and contactor 30 are associated with the circuit of the indicating instrument, as stated above.

Fig. 4 shows this potentiometer in a slightly modified form. Herein the commutator 10' has its recess 14' provided on each side with a groove 36. The two ends of the two contact arms 31' are slidably movable in said two grooves 36 for engagement with one of the plates 11', provided with insulation 12' thereon, and the two arms are thus positively retained in said grooves and recess, irrespective of the vibrations of the potentiometer. The terminal post 21', end plate 25', operating rod 32', etc., are similar to those in the preceding form. Herein, the commutator is shown as provided around its exterior with a suitable coating 37, such as resinous material, to cover and protect the lugs and the wiring of the potentiometer and form a solid block-like member, and thus better adapt this device for handling.

Figs. 5 and 6 illustrate a modified form of potentiometer, wherein the commutator 40 is substantially cylindrical and is composed of a plurality of metal plates or laminations 41 with insulation 42 therebetween, said plates being in the shape of thin washers, and a central channel or bore 44 is provided to extend axially of said plates and commutator, being milled out to form a smooth cylindrical surface. A lug 46 is provided on the peripheral part of each of said plates 41, and these lugs are staggered in a vertical and horizontal direction around this commutator, as shown, to facilitate soldering the resistance wires 48 thereto. The length of said resistance wire 48 between each pair of adjacent lugs 46 on a pair of adjacent plates 41 determines the resistance pattern herein, and the succession of wires between the lugs form segments of a continuous coil of the resistance wire, which constitutes the potentiometer winding, as explained in the above described form. The upper lug 46' and the lower lug 46" of the two end plates have the two ends of the resistance coil thereon and terminals 51 and 52 are connected to said lugs and the ends of said coil. Wires 53 and 54 are connectable with said terminals, being associated with an electrical circuit of an indicating instrument (not shown) with which this potentiometer is used.

A top plate 55 and a bottom plate 56 of insulating material are provided on the two ends of the commutator 40 for protection of the lugs and resistance wires.

The contact member 60 in this form of potentiometer is provided with three contact arms 61, which are equally spaced apart and extend radially outward from the center. Said contactor is mounted on a rod 62 and is therewith operated along the cylindrical axis of the commutator, by a suitable acuating device, similarly to above described rod 32. These arms 61 are generally all in slidable engagement with the smooth interior wall of the cylindrical channel 44, and even under the severest vibration of this potentiometer at least one of the arms 61 will at all times be in contact with a plate 41. An electric wire 64 is herein shown connected with the contactor 60, for connecting it electrically with the needle of an electric instrument or meter with which this potentiometer is used.

The contact areas between contact arms 31, 31' and 61, in Figs. 1, 4 and 6, respectively, and the wall of the channel are made somewhat wider than the thickness of the layers of insulation between the metallic plates so that, as the contact arm moves, connection will be made with the next succeeding plate before contact with the last plate is broken, in order to avoid opening the circuit connected to the contact arms when moving between plates.

Considering the form of Fig. 1, in case the vibration of the potentiometer is sufficient to cause one arm of the contactor to be forced out of contact from its side of the commutator wall, then the other arm will thereby be moved more firmly into contact with its side of the wall; and if the vibrational force is directed so as to move the contactor further inward or outward in the recess, then both arms of the contactor will retain their firm engagement with the commutator plate, so that no arcing can result by the action of this potentiometer. Whereas, in the form of Fig. 4, the ends of the contactor arms will always remain in the grooves and in contact with the channel wall.

In the form of this potentiometer shown in Figs. 5 and 6, the contactor is confined in the channel and at least one of the arms will likewise at all times retain a firm contact with the cylindrical channel wall, irrespective of the direction of movement or the force of any vibration, and thus no arcing can result.

It will be apparent from the above disclosure that with this novel potentiometer, in either of its forms, my novel plural armed contactor, operating within the channel of this novel commutator, will always retain a firm contact with the lamination of the commutator, irrespective of the strength of the vibrational force or the direction of movement of the contactor due to any severe vibration of this potentiometer and its support.

Furthermore, with this disclosed construction, with these thin contact arms and the thin laminations which they engage, a very small amount of movement of the contactor axially of its channel is sufficient to produce a substantial change in the resistance of the potentiometer and in the deflection of the indicating instrument needle.

I claim:

1. A potentiometer comprising a laminated commutator shaped to provide a channel therein extending through the laminations, resistors electrically connected with said laminations and providing the resistance winding, and a contact member mounted to move longitudinally in said channel and containing a plurality of contact arms spaced apart and each in engagement with the channel wall with the points of engagement located in a plane perpendicular to said channel wall, whereby to retain a continuous non-arcing contact at a given voltage point on said potentiometer during operation even though the device is subjected to considerable vibration.

2. A potentiometer comprising a laminated commutator having a channel provided within its confines extending through the laminations, means extending from said laminations being staggered around the commutator and each adjoining pair of said means being connected by resistance means, and a contact member mounted to move longitudinally of said channel and containing a plurality of contact arms spaced apart and having contacts located in a single plane perpendicular to the axis of said channel so that at all times at least one contact is in engagement with the wall within said channel, whereby to maintain a non-arcing contact at a given voltage point on said potentiometer during operation even though subjected to considerable vibration.

3. A potentiometer comprising a laminated commutator composed of superposed thin metal plates and thinner insulating layers therebetween, said plates being provided with a channel extending through the intermediate parts of the plates, means on the outer parts of said plates arranged staggered around the commutator, resistance wires connecting each pair of means of the pair of adjacent plates, and a contact member provided with a plurality of contact arms spaced apart, extending from each other and movable longitudinally of said channel, said arms having contacts located in a plane perpendicular to the wall of said channel and being so spaced and of such length that all contacts will normally engage the channel wall during operation, whereby at all times at least one of said contacts will engage the channel wall at a given point on said potentiometer and thus eliminate any breaking of the contact or arcing.

4. A potentiometer comprising a laminated commutator composed of superposed thin metal plates and thinner insulating layers therebetween, said plates being shaped to provide a channel extending therethrough and substantially at right angles to the plates, lugs extending outward from said plates arranged staggered around the commutator, resistance wires connecting the pair of lugs of a pair of adjacent plates, and a contact member provided with a plurality of spaced contact arms slidably movable longitudinally of said channel, said arms being so spaced and of such length that all of them will normally engage the channel wall during operation with the points of engagement located in a plane perpendicular to the channel wall, whereby even under severe vibration, at least one arm will be in engagement with the channel wall at a given voltage point on the potentiometer and thus eliminate any breaking of the contact or arcing.

5. A potentiometer adapted for connection with and operation of a pressure indicator and comprising a laminated commutator composed of superposed thin metal plates and thinner insulating material therebetween, said plates being provided with a channel extending through all of the plates, means on the outer parts of said plates, resistance wires connecting a pair of said means of the pair of adjacent plates, providing the resistance winding of the potentiometer, and a contact member provided with a plurality of thin contact arms movable longitudinally of said channel, said arms being spaced and extending radially apart and arranged so that their ends will engage the channel wall, at points in a plane perpendicular to said wall whereby even with severe vibration contact is made at a given point on the potentiometer at at least one place so that the resistance change being registered herewith is sufficiently continuous to eliminate any breaking of the contact or jumping of the connected indicator needle.

6. A potentiometer adapted for connection with and operation of a pressure indicator and comprising a laminated commutator composed of superposed thin metal plates and thinner insulating material therebetween, said plates being provided with a channel therein extending substantially at right angles to the plates, lugs on the outer parts of said plates, resistance wires connecting a pair of lugs of the pair of adjacent plates, providing the resistance winding of the potentiometer, and a contactor provided with a plurality of thin contact arms spaced apart and slidable longitudinally of said channel, said arms being spaced and arranged so that all will normally contact the wall of the channel and so that the areas of contact between said arms and said wall have the same position longitudinally of the channel, whereby in the presence of vibration at least one of said arms will always be in contact with the wall of said channel and whereby the thinness of said plates and insulating material permits a small amount of movement of the contactor to register a substantial resistance change on the indicator.

7. A potentiometer comprising a commutator composed of a plurality of thin metal washer-shaped plates and thinner layers of insulating material therebetween arranged to provide a central channel extending through said plates at right angles thereto, a lug on the periphery of each plate, said lugs being arranged staggered around the commutator, resistance wires connecting each pair of lugs of each pair of adjacent plates and forming the resistance winding of the commutator, a contact member located within and movable axially of said channel and having a plurality of spaced apart contact arms arranged to contact the wall of said channel, said contact arms being so positioned that the areas of contact between said arms and said wall are equidistant from a plane parallel to said plates.

8. A potentiometer comprising a commutator composed of a plurality of thin metal plates substantially rectangular and thin layers of insulating material therebetween arranged to provide a channel extending through the intermediate part of the plates, a lug on the periphery of each plate, said lugs being arranged staggered around the commutator, resistance wires connecting each pair of lugs of the pair of adjacent plates and forming the resistance winding of the commutator, and a contact member provided with means for operating it in said channel and having a plurality of spaced radially extending arms thereon arranged to have their outer ends in constant engagement with the inner wall of said channel at points in a plane perpendicular to said wall, whereby to eliminate any break or variation in the contact to the potentiometer due to vibration.

9. A potentiometer comprising a commutator comprising a plurality of superposed thin metal plates substantially rectangular and insulated from each other, said plates being provided through their intermediate part with a channel open at one side of the commutator and having grooves in its two opposite parts, a lug on the outer part of each plate, said lugs being arranged staggered around the commutator, resistance wire connecting each pair of adjacent lugs of each pair of adjacent plates thus providing a succession of resistors and together forming the resistance winding of the commutator, and a contactor operable in said channel and having two oppositely extending contact arms which have their outer ends slidable in said grooves and in constant engagement with the walls thereof and with the points of engagement in a plane parallel to said plates, whereby to eliminate any arcing, even under severe vibrational movement of the potentiometer.

10. A potentiometer comprising an assembly made up of a plurality of superposed thin metal plates and thinner layers of insulating metal between said plates, a resistance element connected between each pair of adjacent plates, a channel extending through said plate assembly in a direction perpendicular to said plates, a contact number provided with a plurality of contact arms having contacts located in a plane parallel to said plates whereby all arms normally make contact at one voltage point on said potentiometer and in the presence of vibration at least one of said arms makes contact at said one voltage point in said potentiometer at a given time, and means for moving said contact member along said channel.

CHARLES F. SOPCAK.

REFERENCES CITED

The following references are of record in the file of this patent:

UNITED STATES PATENTS

| Number | Name | Date |
|---|---|---|
| 1,568,724 | Cox | Jan. 5, 1926 |
| 1,633,521 | Edwards | June 21, 1927 |

FOREIGN PATENTS

| Number | Country | Date |
|---|---|---|
| 860,970 | France | Jan. 29, 1941 |